INVENTOR.
CHARLES M. VAUGHN.
BY
his ATTORNEY.

Oct. 5, 1954

C. M. VAUGHN 2,690,873

COMBINED THERMOSTAT AND AUTOMATIC PILOT CONTROL

Filed July 3, 1951

INVENTOR.
CHARLES M. VAUGHN.
BY Albert J. Henderson
his
ATTORNEY.

INVENTOR.
CHARLES M. VAUGHN.

UNITED STATES PATENT OFFICE 2,690,873

COMBINED THERMOSTAT AND AUTOMATIC PILOT CONTROL

Charles M. Vaughn, Los Angeles, Calif., assignor to Robertshaw-Fulton Controls Company, Greensburg, Pa., a corporation of Delaware Application July 3, 1951, Serial No. 235,038

6 Claims. (Cl. 236—21)

This invention relates generally to fuel control devices and more particularly to combination controls for gas appliances.

A primary object of this invention is to utilize movement of an electromagnet between positions for effecting a controlling operation.

It is a further object of this invention to effect 100% shut off of fuel to all burners of an appliance in response to movement of an electromagnet to a predetermined position.

Another object of this invention is to prevent flow of fuel to a main burner during the resetting of a thermoelectric shut off device.

Another object of this invention is to permit flow of fuel to a pilot burner while preventing flow of fuel to a main burner during the resetting of the thermoelectric shut off device.

Another object of this invention is to arrange the shut off cock, thermostatic valve and thermoelectric shut off device so that an operator is required to follow correct procedure in lighting the appliance.

To effect the aforementioned objects, a casing may be provided with a thermostatic valve and a shut off cock to control the flow of fuel therethrough, the operating member of the cock being also associated with the thermostatic valve to adjust the temperature at which the same will be operated. A thermomagnetic shut off device may be associated with the thermostatic valve to maintain the valve in a closed position when a predetermined condition exists. The shut off device may comprise a movable armature mounted on the casing and biased to one position and a movable electromagnet biased to a released position relative to the armature and operatively engageable with the valve in the released position to maintain the valve in one of its controlling positions regardless of the operation of the thermally responsive parts thereof. Reset means, cooperable with the armature and with the operating member of the cock, may be effective to reset the shut off device by moving the armature against both the above mentioned biases and into engagement with the electromagnet where it will be attracted by the electromagnet if the same is energized. Release of the reset means upon completion of the resetting operation will then permit the armature to return to its initial position under its bias with the electromagnet being carried along therewith.

Other objects and advantages will appear from the following specification taken in conjunction with the accompanying drawings wherein.

Figure 1:
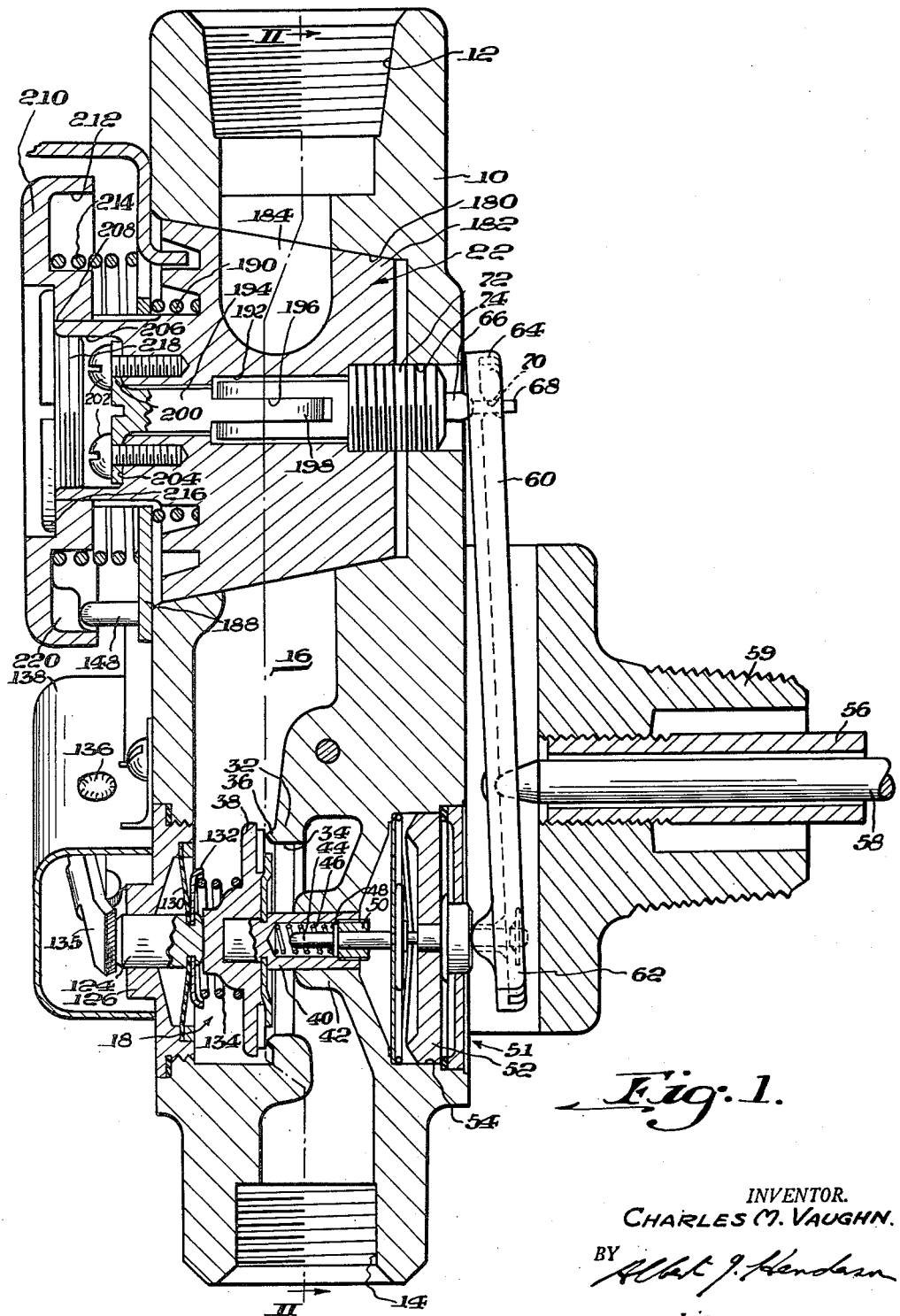
Fig. 1 is a sectional view of a combination control device embodying this invention.
Figure 2:
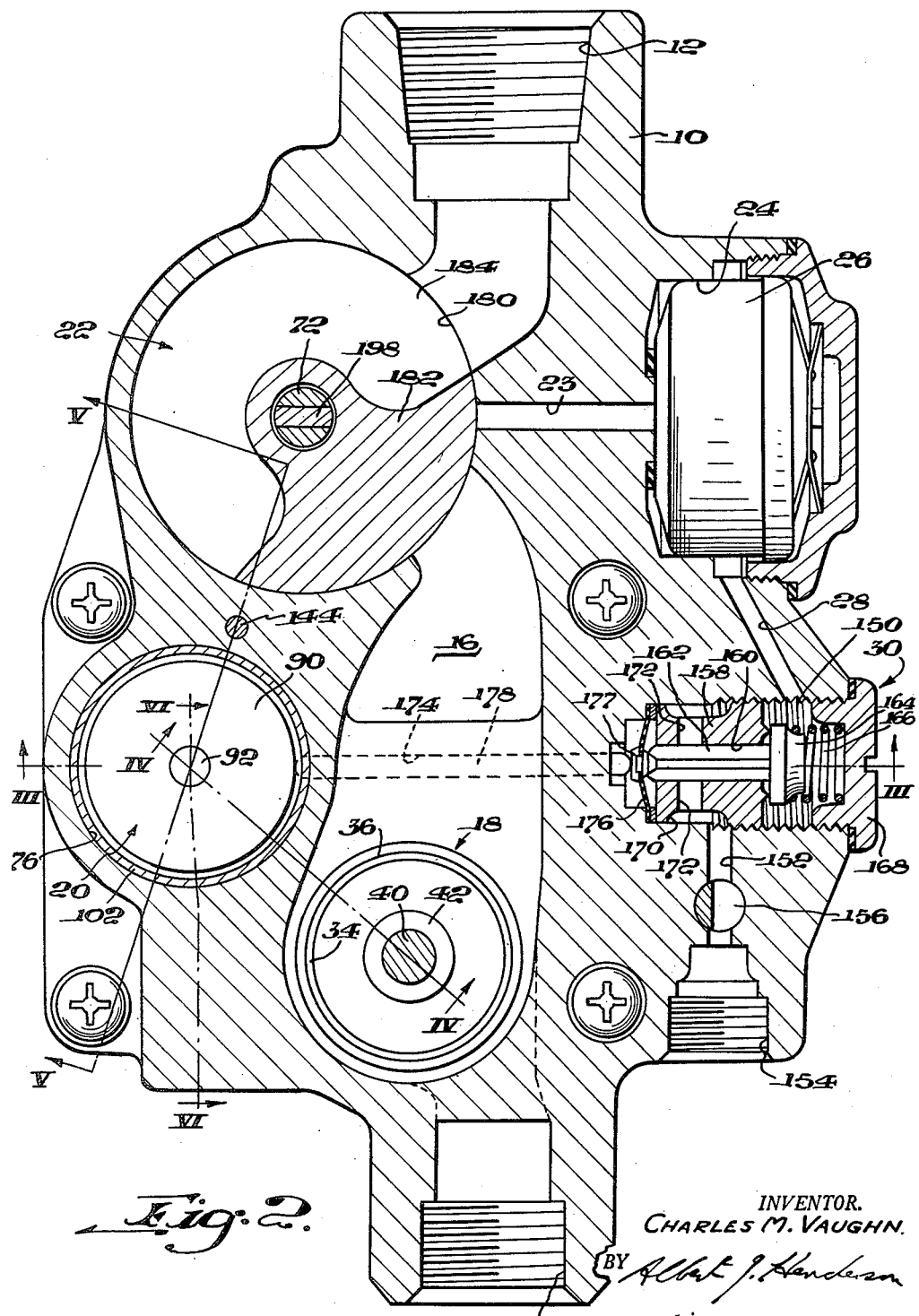
Fig. 2 is a sectional view taken on the line II—II of Fig. 1 looking in the direction of the arrows.
Figure 3:
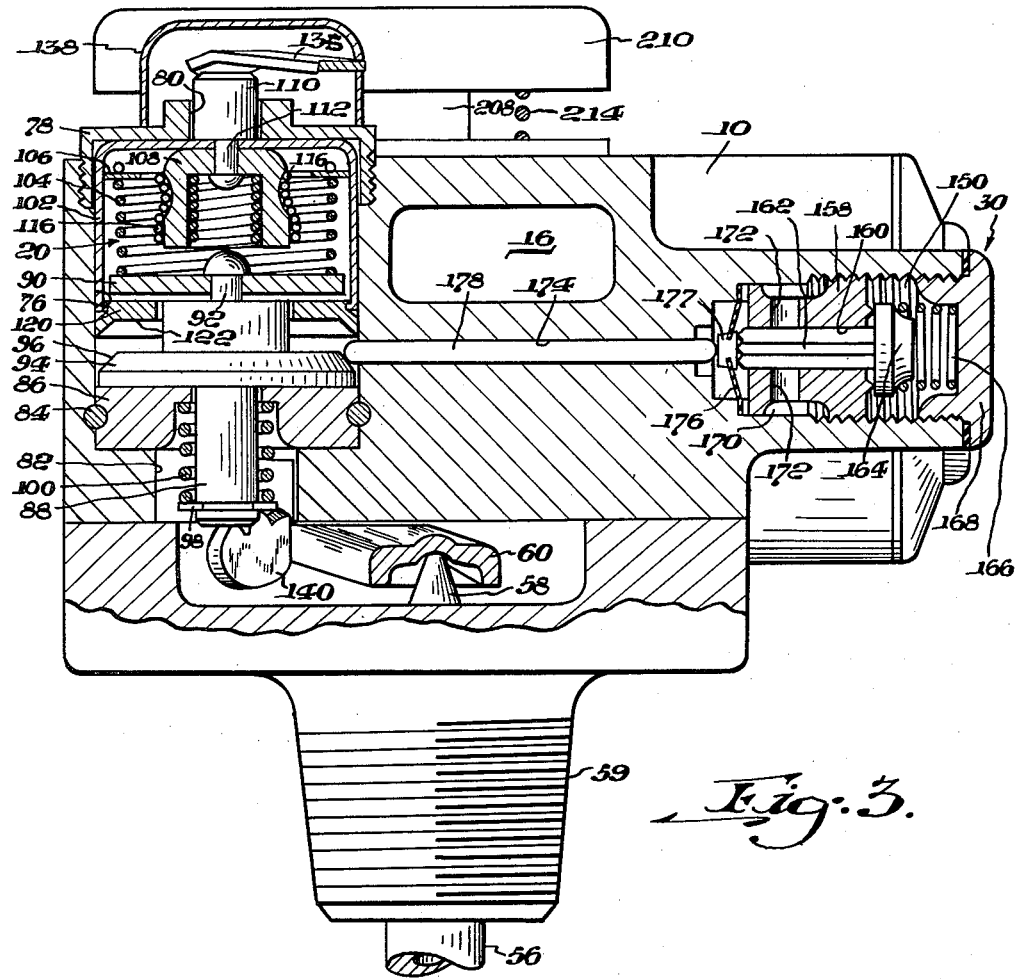
Fig. 3 is a sectional view taken on the line III—III of Fig. 2 looking in the direction of the arrows.

Referring to Figs. 1, 2 and 3, the control device structure is shown as comprising a casing 10 provided with an inlet 12 and an outlet 14 connected by a main fuel passage 16. The outlet 14 is adapted to be connected to a main burner (not shown) of a fluid fuel burning appliance and the flow of fluid fuel in the passage 16 is under the control of a thermostatically controlled valve 18 which has associated therewith a shut off device 20 operable in response to a predetermined condition to position the thermostatic valve 18 for preventing flow of fuel through the passage 16.

Interposed in the passage 16 between the inlet 12 and the thermostatically controlled valve 18 is a main shut off cock 22 which is movable between positions for controlling the flow of fuel to the passage 16. The main shut off cock 22 may also control the flow of fuel to a passage 23 formed in the casing 10 and communicating with the passage 16 and with a filter chamber 24. A fuel filter 26 of any suitable form is disposed within the filter chamber 24 and the chamber 24 communicates with an auxiliary passage 28 formed in the casing 10 and leading to the inlet of the valve chamber of an auxiliary or pilot valve 30 which may control the flow of fuel to a pilot burner (not shown). The pilot valve 30 is operatively associated with the shut off device 20 as will more fully appear.

Thermostatically controlled valve

The thermostatically controlled valve 18 may comprise a partition 32 traversing the passage 16 and having a port 34 formed therein. A valve seat 36 formed on the partition 32 around the port 34 is cooperable with a reciprocable valve member 38 to close the port 34. The valve member 38 is here shown as being of the disk type and mounted upon a hollow valve stem 40 which slidably extends through an axial hollow boss 42 carried by the casing 10 in axial alignment with the port 34. The port 34 in the partition 32 provides communication between the main fuel passage 16 and the outlet 14 and the valve member 38 is normally biased toward the seat 36 to close such communication by means to be more fully described.

The hollow valve stem 40 contains an override mechanism comprising a plunger 44 and biasing spring 46 which serves to urge a collar 48 on the plunger 44 into engagement with a bushing 50 closing the inner end of the hollow valve stem 40. The plunger 44 projects through the bushing 50 for operative engagement with a snap action mechanism 51 of well known form including a thrust element 52 which is disposed in a recess 54 formed in the casing 10 in axial alignment with the port 34. The snap action mechanism 51 imparts a snap action movement to the valve member 38 in a manner well known in the art.

Thermally responsive actuating means is provided for moving the valve member 38 between controlling positions and may include a thermal element of the rod-and-tube type with a tube 56 of expansible material secured to the casing 10 and a rod 58 of relatively nonexpansive material secured at one end (not shown) to the tube 56 and extending into the casing 10 to be free to move relative thereto. An elongated annular boss 59 encompassing the tube 56, is carried by the casing 10 and is suitably threaded for mounting on an appliance (not shown).

The free end of the rod 58 is in engagement with a lever 60 intermediate the ends thereof. One end 62 of the lever 60 operatively engages the thrust element 52 of the snap action mechanism 51 and the other end 64 of the lever 60 is engageable by an adjustable fulcrum element 66. Supported on and coaxial with the fulcrum element 66 is a pintle 68 which extends through an aperture 70 formed in the lever 60 to maintain the lever 60 aligned with the fulcrum element 66. The fulcrum element 66 is carried by a rotatable adjusting element 72 threaded into an aperture 74 formed in the casing 10 in axial alignment with the shut off cock 22.

It will be apparent to those skilled in the art that rotation of the adjusting element 72 relative to the casing 10 will effect axial movement thereof to adjust the fulcrum 66 through a range of positions and that the temperature at which the rod-and-tube element 56, 58 will cause actuation of the snap action mechanism 51 and valve member 38 will be determined by the position of the fulcrum element 66. Since temperature setting and actuating mechanisms for thermostatically controlled valves of the type herein disclosed are well known in the art, a detailed description of the operation thereof is deemed unnecessary.

Thermoelectric shut-off device

As hereinbefore pointed out, the shut off device is provided for moving the valve member 38 to closed position in response to a predetermined condition, preferably extinguishment of the pilot burner flame, regardless of the thermal condition of the thermostat 56, 58. To this end, and as best shown in Figs. 3-6, a cylindrical recess 76 is formed in the casing 10 laterally of the thermostatic valve 18 and the shut off cock 22 with the axis thereof parallel to the axes of the thermostatic valve and shut off cock. One end of the recess 76 is closed by a threaded cap 78 having an axially disposed aperture 80 formed therein. A bore 82 coaxial with the recess 76 extends through that part of the casing 10 which forms the bottom wall of the recess 76. Secured in the bottom of the recess 76 by any suitable means, here shown as set screws 84, is an annular bearing element 86 through which slidably extends an armature stem 88.

An armature 90 of suitable magnetic material is loosely mounted on one end of the armature stem 88 by a rivet 92 and a radially extending flange 94 is carried on the medial portion of the armature stem 88. The peripheral portion of the flange 94 is beveled at 96 for a purpose which will more fully appear. Acting between the bearing element 86 and a flange 98 mounted on the end of the armature stem opposite the end which carries the armature 90, is a coil spring 100 which serves to bias the armature stem downward as viewed in the drawings and urge the flange 94 into engagement with the bearing element 86.

Slidably mounted in the recess 76 is a cup-shaped magnet cover 102 which is biased toward the cap 78 by a coil spring 104 acting between the armature 90 and an annular plate 106 secured to the inner face of the magnet cover 102 by any suitable means. An electromagnet is mounted within the magnet cover 102 and may comprise a horseshoe frame 108 with the bight thereof abutting the closed end of the cover 102.

A cylindrical thrust element 110 is mounted on the outside of the magnet cover 102 to extend through the aperture 80 in the cap 78 and has a reduced end portion 112 which extends through suitable bores in the cover 102 and bight of the horseshoe frame 108, the end thereof being peened over to secure the thrust element 110, cover 102 and horseshoe frame 108, together.

The usual electromagnet winding has one end secured to the casing 10 by a suitable clamp 114 to provide a ground connection and the winding continues in the form of a pair of coils 116 respectively encompassing the legs of the horseshoe frame 108. The opposite end of the magnet winding is secured in a socket 118 formed in the casing 10 and adapted for electrical connection to a source of electrical energy which source may comprise a thermocouple (not shown) having a hot junction adapted for exposure to a flame at the pilot burner.

The end of the magnet cover 102 opposite the end supporting the magnet frame 108 is secured to an annular bearing element 120 through which slidably extends that portion of the armature stem 88 between the armature 90 and the flange 94. The face 122 of the bearing element 120 adjacent the flange 94 is formed to be complementary with the adjacent face of the flange 94 and the bearing element 120 is so positioned relative to the horseshoe frame 108 that the flange 94 will be contiguous thereto when the armature 90 is in engagement with the pole faces of the magnet 108.

Figure 4:
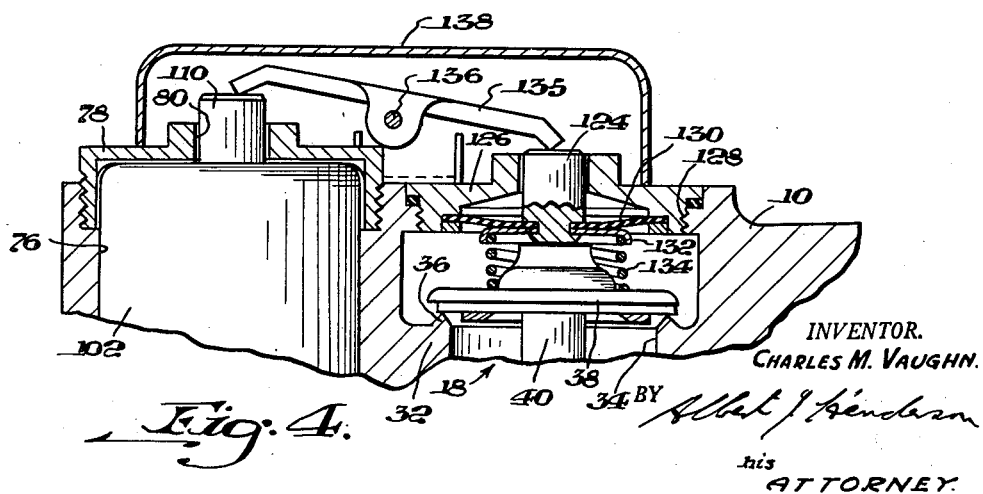
Fig. 4 is a fragmentary sectional view taken on the line IV—IV of Fig. 2 looking in the direction of the arrows.

Means is provided for establishing an operative connection between the magnet 108 and the valve member 38 when the magnet is in its biased or uppermost position as shown in the drawings. This means, as best shown in Fig. 4, may take the form of a thrust element 124 slidably mounted in an apertured cap 126 threaded into an opening 128 formed in the casing 10 in axial alignment with the valve port 34. The thrust element 124 is secured to the central portion of a flexible sealing disk 130 and is movable into engagement with the valve member 38. The sealing disk 130 is secured at its periphery to the cap 126 by any suitable means to prevent leakage of fuel around the thrust element 124 and carries a spring retainer 132 on the underside thereof. Acting between the spring retainer 132 and the valve member 38 is a coil spring 134 which serves to bias the valve member 38 toward the valve seat 36 and to bias the thrust element 124 away from the valve member 38.

A lever 135, disposed outside the casing 10, is pivoted intermediate the ends thereof at 136 on a suitable housing 138 secured to the casing 10 by any suitable means (not shown). The ends of the lever 135 extend respectively over the thrust elements 110 and 124 to be engageable thereby for transmitting movements therebetween. The lever 135 is so proportioned that it will hold the thrust element 124 in engagement with the valve member 38 and the valve member 38 in turn in engagement with the valve seat 36 when the magnet cover 102 and its associated thrust element 110 are in the biased position with the magnet cover 102 abutting the cap 78. As the spring 104 is considerably stronger than the valve spring 134, sufficient force is exerted thereby on the valve member 38 to hold the same in its closed position relative to the valve seat 36 whenever the pole faces of the magnet 108 are disengaged from the armature 90.

*Resetting device*

Figure 5:
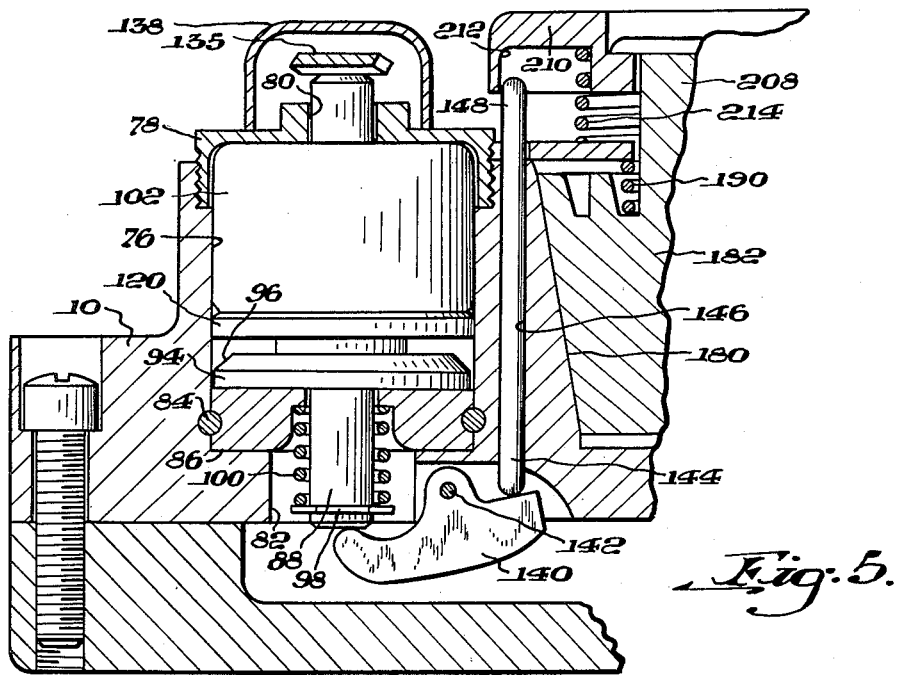
Fig. 5 is a fragmentary sectional view taken on the line V—V of Fig. 2 looking in the direction of the arrows.
Figure 6:
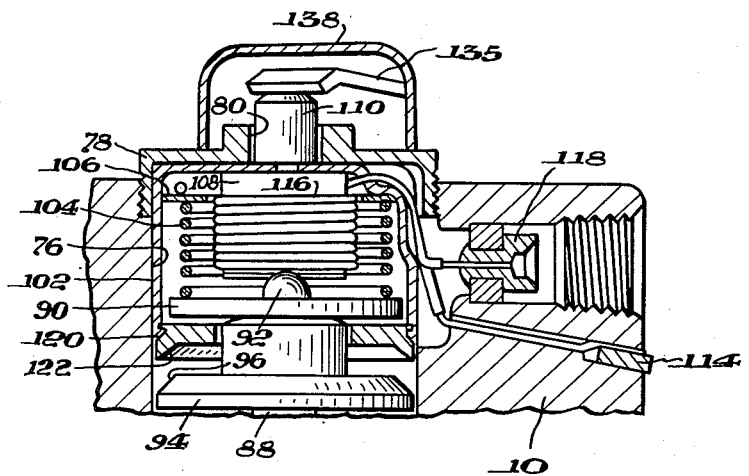
Fig. 6 is a fragmentary sectional view taken on the line VI—VI of Fig. 2 looking in the direction of the arrows.

In devices of this type wherein a thermocouple adapted to be heated by the pilot flame is utilized to generate the electrical energy, the energy so generated is insufficient to overcome the bias of the spring 104 but is sufficient to hold the armature 90 and magnet 108 in engagement after the usual resetting operation has been conducted. Consequently, manual resetting means is provided for moving the armature 90 into engagement with the magnet 108 and takes the form of a rocker arm 140 which, as best shown in Fig. 5, is pivoted at 142 on the casing 10 and has one end thereof engaging the free end of the armature stem 88. The other end of the rocker arm 140 abuts one end of a push rod 144 slidably mounted in a bore 146 formed in the casing 10 adjacent the shut off cock 22 and parallel to the axis thereof. The bore 146 extends completely through the casing 10 and the free end 148 of the push rod 144 projects beyond the casing 10 for engagement by operating means to be more fully described.

*Pilot valve*

To obtain 100% shut off fuel to all burners, the auxiliary or pilot valve 30 is operatively associated with the electromagnetic shut off device 20 so that the pilot valve is in open position only while the resetting means is in operation and while the magnet 108 is in engagement with the armature 90.

The pilot valve 30 is best shown in Figs. 2 and 3 and may take the form of a pilot valve chamber 150 formed in the casing 10 laterally of the recess 76. The pilot valve chamber 150 communicates with the auxiliary passage 28 and with a pilot passage 152 formed in the casing 10 for communication with an outlet 154 adapted for connection to the pilot burner (not shown). The rate of flow through the pilot passage 152 may be regulated in the usual manner by a conventional valve 156.

An annular valve seat member 158 is positioned in the valve chamber 150 in threaded engagement with the walls thereof to intercept flow of fluid therethrough and is provided with a centrally disposed port 160 having a circular cross section. Slidably carried in the valve port 160 is a non-circular valve stem 162 which carries a disk valve member 164 at one end. A spring 166 acting between the valve member 164 and a cap 168 threaded into the open end of the valve chamber 150 serves to bias the valve member 164 toward the valve seat 158.

When the valve member 164 is in its biased position and in engagement with the valve seat member 158, fluid flow through the valve chamber 150 is prevented. Conversely, when the valve member 164 is positioned away from the valve seat 158, fuel is permitted to flow from one side of the valve seat member 158 to the other side thereof through the valve port 160, passing between the surface of the non-circular valve stem 162 and the walls of the port 160.

Communication is established between the pilot passage 152 and the valve port 160 by an annular groove 170 formed in the valve seat member 158 to register with the pilot passage 152 and connected to the valve port 160 by a plurality of radially extending bores 172. Thus, fuel flowing through the valve port 160 passes through the bores 172, the groove 170, and the pilot passage 152 to the pilot burner (not shown) so that the flow of fuel to the pilot burner is controlled by the valve member 164.

The end of the valve chamber 150 opposite the end closed by the cap 168 registers with a bore 174 formed in the casing 10 and opening into the recess 76. Communication between the valve chamber 150 and the recess 76 is prevented by a flexible sealing disk 176 which carries an axially located rivet 177 and is clamped across the end of the valve chamber 150 by the annular valve seat member 158. Abutting one side of the rivet 177 is the free end of the valve stem 162 and abutting the other side of the rivet 177 is one end of an operating member here shown as a pin 178 slidably carried in the bore 174. The axes of the bore 174 and the pin 178 are substantially normal to the axis of the armature stem 88 and the other end of the pin 178 extends into the recess 76 to alternatively contact the peripheries of the bearing element 129 or the flange 94 as will be more fully brought out in a discussion of the operation of the device.

*Main shut-off cock*

As best shown in Figs. 1 and 2, the main shut off cock 22 is here shown as being of the plug type and comprising a tapered valve seat 180 formed in the casing 10 for receiving a plug valve member 182. The valve member 182 is provided with an arcuate groove 184 which extends around a substantial portion of the periphery of the valve member 182. The groove 184 is adapted to register only with the inlet 12 in one position of the valve member 182 to provide a closed or "Off" position, to register with the inlet 12 and the passage 23 in another position of the valve member 182 to provide a "Pilot" position and to register with the inlet 12, the passage 23 and the passage 16 in still another position of the valve member 182 to provide a full open or "On" position in a manner well known in the art.

Interposed between the valve member 182 and a cover plate 188 secured to the casing 10 is a spring 190 which serves to bias the valve member 182 against the valve seat 180 with sufficient force to establish a fluid sealing but rotatable relation therebetween.

An axially extending bore 192 formed in the valve member 182 loosely receives the rotatable adjusting element 72 of the thermostat and a shaft 194, which is secured to the valve member 182 for rotation therewith, extends into engagement with the adjusting element 72. A slot 196 formed in the adjusting element 72 slidingly receives a rectangular extension 198 of the shaft 194 to provide a slidable torque transmitting connection between the shaft 194 and the adjusting element 72. Rotation of the valve member 182 and its associated shaft 194 will thus produce rotational and consequent axial movement of the adjusting element 72 without corresponding axial movement of the shaft 194. Thus, for each setting of the valve member 182 there will be a corresponding position for the adjusting element 72 to set the temperature at which the thermostat will actuate the valve member 38. It is to be noted that the groove 184 in the vavle member 182 is of sufficient length to insure the maintenance of communication between the inlet 12 and the passage 16 throughout a range of angular positions of the valve member 182.

To permit calibration of the temperature adjusting means, the end of the shaft 194 opposite the end which carries the rectangular extension 198 is provided with a flange 200 having arcuate slots (not shown) therein for receiving a pair of screws 202 which are threaded into the valve member 182. The screws 202 normally hold the flange 200 securely against a shoulder 204 provided by a counterbore 206 formed in the valve member 182 in axial alignment with the bore 192. To adjust the correlation between the shaft 194 and the valve member 182, the screws 202 may be loosened, the shaft 194 displaced angularly relative to the valve member 182 and the screws 202 retightened.

To provide for rotation of the valve member 182 and shaft 194, an axially extending splined boss 208 is provided on the valve member 182 and an internally splined knob 210 is mounted thereon to be slidable axially thereof and rotatable therewith. The knob 210 is provided on the underside thereof with an annular groove 212 into which one end of a coil spring 214 extends. The other end of the spring 214 abuts the cover plate 188 so that the spring 214 serves to bias the knob 210 away from the valve member 182 and into engagement with a flange 216 extending radially from a plug 218 threaded into the counterbore 206.

The knob 210 extends radially beyond the projecting end 148 of the push rod 144 of the resetting device and the end 148 extends into the annular groove 212 formed in the knob 210. The groove 212 is of sufficient depth so that the knob 210 may normally be moved axially of the valve member 182 against the bias of the spring 214 without engaging the push rod 144. However, a land portion 220 is formed in the bottom of the groove 212 to be aligned and thus engageable with the end 148 of the push rod 144 when the valve member 182 is in the aforementioned "Pilot" position. It will thus be apparent that when the valve member 182 is in the "Pilot" position, the knob 210 may be moved axially of the valve member 182 against the bias of the spring 214 to cause the land portion 220 to engage the end 148 of the push rod 144 and cause axial movement of the latter. Such axial movement of the push rod 144 will cause clockwise rotation of the rocker arm 140, as viewed in Fig. 5 of the drawings, and upward movement of the armature stem 88 against the biases of the spring 100 and the spring 104 to move the armature 90 into engagement with the pole faces of the magnet 108.

*Operation*

When no fuel is flowing to the main or pilot burners, the various parts of the control device are positioned as shown in the drawing. The magnet 108 is in its biased position with the thrust element 110 acting under the bias of the spring 104 and through the lever 135 to hold the thrust element 124 against the valve member 38 and maintain the valve member 38 in engagement with the valve seat 36. The armature stem 88 and its associated parts are held in their lowermost positions under the bias of the spring 100 and the pin 178 is in engagement with the beveled face 96 of the flange 94 to permit the pilot valve member 164 to engage the valve seat 158 under the bias of the spring 166.

To place the control device in operative condition, the knob 210 is rotated to position the valve member 182 of the main shut off cock 22 in the "Pilot" position wherein the groove 184 establishes communication between the inlet 12 and the passage 23 and the land 220 is aligned with the push rod 144. In such position of the valve member 182, fuel will flow from the inlet 12 through the groove 184 in the valve member 182, the passage 23, filter 26 in the filter chamber 24 and through the passage 28 to the pilot valve chamber 150.

The resetting operation is then conducted by applying manual pressure to the knob 210 to move the same against the bias of the spring 214 causing the hereinbefore described axial movement of the push rod 144, clockwise rotation of the rocker arm 140 about its pivot 142, and upward movement of the armature stem 88 and its associated parts against the biases of the spring 100 and the spring 104. During this movement, the springs 100 and 104 are compressed, the armature 90 is moved into engagement with the pole faces of the magnet 108 and the pin 178 is forced to ride up the beveled surface 96 of the flange 94 as the bevel 96 acts effectively as a cam surface. The pin 178 is thus moved laterally relative to the armature stem 88 to move the valve stem 162 of the pilot valve against the bias of the spring 166 to position the pilot valve member 164 in its open position away from the valve seat 158. Fuel will then flow through the valve port 160, bores 172, groove 170, and pilot passage 152 to the pilot burner (not shown) where it may be ignited by a match or the like. The flame at the pilot burner may heat the hot junction of the thermocouple (not shown) to cause the same to develop sufficient current to energize the coils 116 of the electromagnet. The knob 210 is then released and permitted to move into engagement with the flange 216 under the bias of the spring 214 and the bias of the spring 100 serves to retract the armature stem 88 and armature 90 to their initial positions. However, the magnet 108, magnet cover 102 and thrust element 110 are now carried along with the armature 90 and the coil spring 104 is retained in its compressed condition.

It is to be noted that during the resetting operation, the electromagnet remains in its uppermost position where it is effective to retain the thermostatic valve closed. Thus no fuel flow through the passage 16 can take place during resetting It will be apparent that, after resetting, the thrust element 110 can no longer exert a force on the lever 135 to hold the thrust element 124 in engagement with the valve member 38 so that the valve member 38 is freed for movement to open position relative to the valve seat 36. It will also be apparent that when the magnet cover 102 moves downward with the armature 90, the face 122 of the bearing element 120 will remain contiguous to the adjacent face of the flange 94. Thus, upon completion of the resetting operation, the periphery of the bearing element 120 is positioned to engage the pin 178 to prevent the pin 178 from riding down the bevel surface 96 of the flange 94 under the bias of the spring 166 and the valve member 164 is maintained in its open position.

The knob 210 may now be rotated to move the valve member 182 of the main shut off cock 22 to a position wherein the groove 184 formed therein is in communication with the inlet 12, the passage 23 and the main fuel passage 16. Such rotation of the knob is also effective to rotate the adjusting element 72 of the thermostat to set a particular temperature at which the thermostat 56, 58 will actuate the valve member 38.

Upon a demand for heat, the rod 58 exerts a force on the lever 60 and the thrust element 52 of the snap action mechanism 51. The snap action mechanism opens the valve member 38 against the bias of the valve spring 134 and flow of fuel from the inlet 12, through the main fuel passage 16, through the valve port 34 and through the outlet 14 takes place to permit operation of the main burner in the usual manner.

When the temperature sensed by the thermostat 56, 58 reaches that for which the adjustment has been set, closure of the valve member 38 occurs under bias of the spring 134 and is permitted due to reverse positioning of the snap action mechanism as is well known to those skilled in the art. During this normal reciprocation of the valve member 38 in controlling flow of fuel to the outlet 14, the pole faces of the magnet 108 remain engaged with the armature 90.

In the event that the flame at the pilot burner is extinguished, the supply of current to the electromagnet will be cut off and, upon deenergization of the electromagnet, the magnet 108, magnet cover 102 and thrust element 110 will move away from the armature 90 under the bias of the spring 104. The thrust element 110, engaging the lever 135, will rotate the same about its pivot 136 in a clockwise direction. Clockwise rotation of the lever 135 will force the thrust element 124 downward against the bias of the spring 134 and into engagement with the valve member 38 to move the same into engagement with the valve seat 36. As previously indicated, such movement of the valve member 38 into engagement with the seat 36 will occur regardless of whether the thermostat 56, 58 is operating to hold the valve member 38 in open position due to the provision of the override connection within the hollow valve stem 40, the bias of the override spring 46 being overcome upon release of the magnet 108 by the stronger bias exerted by the coil spring 104. The hollow valve stem 40 moves relatively to the plunger 44 during compression of the override spring 46 without causing reverse operation of the snap action mechanism 51 as in normal thermostatic operation.

Movement of the magnet 108 from attracted to released position will also cause the bearing element 120 carried by the magnet cover 102 to move relative to the pin 178 and carry the bearing element 120 out of engagement with the end of the pin 178. Since the pin 178 is no longer restrained by the bearing element 120, it is moved laterally relative to the armature stem 88 under the bias of the spring 166 to permit the pilot valve member 164 to move into engagement with the valve seat 158 thereby cutting off the flow of fuel to the pilot burner. The various parts of the control device, with the exception of the main shut off cock 22, are now once again positioned as shown in the drawings and no fuel can flow to any of the burners.

It will be apparent from the foregoing that the illustrated embodiment provides 100% shut off of fuel to all burners upon failure of the pilot flame, prevents flow of fuel to a main burner during the resetting operation, and utilizes movement of an electromagnet for effecting a controlling operation thus accomplishing the objects of the invention. It will also be apparent that many changes may be made in the details of construction and arrangement of parts to accomplish the purpose of this invention without departing from the scope thereof as defined in the appended claims.

It is claimed and desired to secure by Letters Patent:

1. In a control device for fluid fuel burners, the combination of a casing, valve means movable between positions for controlling the flow of fuel through said casing, thermally responsive actuating means, yieldable means operatively associated with said actuating means for moving said valve means between said controlling positions, a movable armature mounted on said casing and biased to a first position, a movable electromagnet mounted on said casing for movement between attracted and released positions relative to said armature and biased to said released position, said electromagnet being adapted when energized to hold itself in said attracted position, an operative connection between said electromagnet and said valve means for overcoming said yieldable means and holding said valve means in one of said controlling positions when said electromagnet is in said released position, reset means for moving said armature against both said biases and into engagement with said electromagnet, said armature being free to return to said first position upon completion of the resetting operation, auxiliary valve means movable between controlling positions and biased to one of said positions, and auxiliary valve actuating means cooperable with said armature for moving said auxiliary valve means to another of said controlling positions during the resetting operation.

2. A control device as claimed in claim 1 wherein said auxiliary valve actuating means is cooperable with said electromagnet for holding said auxiliary valve means in said other position while said electromagnet is in said attracted position.

3. In a control device for fluid fuel burners, the combination of a casing, valve means movable between positions for controlling the flow of fuel through said casing, thermally responsive actuating means, yieldable means operatively associated with said actuating means for moving said valve means between said controlling positions, a movable armature mounted on said casing and biased to a first position, a movable electromagnet mounted on said casing for movement between attracted and released positions relative to said armature and biased to said released position, said electromagnet being adapted when energized to hold itself in said attracted position, a lever device cooperable with said valve means and having an active position for overcoming said yieldable means and holding said valve means in one of said controlling positions, said electromagnet being operatively associated with said lever device for moving the same to said active position in said released position of said electromagnet and freeing the same for movement to an inactive position in said attracted position of said electromagnet, reset means for moving said armature against both said biases into engagement with said electromagnet and thereafter returning said armature to said first position, auxiliary valve means movable between controlling positions and biased to one of said positions, and auxiliary valve actuating means operatively associated with said armature for moving said auxiliary valve means to another of said controlling positions during the resetting operation.

4. A control device as claimed in claim 3 wherein said auxiliary valve actuating means comprises an operating member operatively associated with said auxiliary valve means, said operating member being arranged to be engaged by said armature during the resetting operation and by said electromagnet upon completion of the resetting operation for holding said auxiliary valve means in said other controlling positions while said electromagnet is in said attracted position.

5. In a control device for fluid fuel burners, the combination of a casing, valve means movable between positions for controlling the flow of fuel through said casing, thermally responsive actuating means, yieldable means operatively associated with said actuating means for moving said valve means between said controlling positions, a movable armature mounted on said casing and biased to a first position, a movable electromagnet mounted on said casing for movement between attracted and released positions relative to said armature and biased to said released position, said electromagnet being adapted when energized to hold itself in said attracted position, a lever device operatively associated with said valve means and having an active position for overcoming said yieldable means and holding said valve means in one of said controlling positions, said electromagnet being operatively associated with said lever device for moving the same to said active position in said released position of said electromagnet and freeing the same for movement to an inactive position in said attracted position of said electromagnet, reset means for moving said armature against both said biases into engagement with said electromagnet and thereafter returning said armature to said first position, second valve means movable between positions for controlling fuel flow through said casing, means movable for adjusting said thermally responsive means to respond to a selected temperature condition, manually operable means for moving said second valve means between said positions and substantially simultaneously actuating said adjusting means, and an operative connection between said manually operable means and said reset means for actuating said reset means upon manipulation of said manually operable means.

6. In a control device for fluid fuel burners, the combination of a casing, valve means movable between positions for controlling the flow of fuel through said casing, thermally responsive actuating means, yieldable means operatively associated with said actuating means for moving said valve means between said controlling positions, movable means for adjusting said thermally responsive means to respond to a selected temperature condition, electromagnet means having an element movable between first and second positions, an operative connection between said element and said valve means for overcoming said yieldable means and holding said valve means in one of said controlling positions in said first position of said element, said element being ineffective in said second position thereof to control said valve means, reset means for moving said element to said second position, second valve means movable between positions for controlling fuel flow through said casing, a manually operable member for moving said second valve means between said controlling positions, an operative connection between said manually operable member and said electromagnet means for setting said element in said second position, and an operative connection between said manually operable member and said adjusting means for adjusting the latter to a selected temperature setting.

References Cited in the file of this patent

UNITED STATES PATENTS

| Number | Name | Date |
|---|---|---|
| 2,290,108 | Mantz | July 14, 1942 |
| 2,305,941 | Wantz | Dec. 22, 1942 |
| 2,361,945 | Jackson | Nov. 7, 1944 |
| 2,447,668 | Ray | Aug. 24, 1948 |
| 2,455,542 | Weber | Dec. 7, 1948 |
| 2,477,078 | Mueller | July 26, 1949 |
| 2,513,705 | Arden | July 4, 1950 |
| 2,588,179 | Thronberry | Mar. 4, 1952 |
| 2,604,266 | Jackson | July 22, 1952 |
| 2,616,451 | Hunter | Nov. 4, 1952 |